US010019790B2

(12) United States Patent
Bonefas et al.

(10) Patent No.: US 10,019,790 B2
(45) Date of Patent: Jul. 10, 2018

(54) FILL LEVEL INDICATOR FOR AN AUTOMATED UNLOADING SYSTEM

(71) Applicants: CARNEGIE MELLON UNIVERSITY, a Pennsylvania Non-Profit Corporation, Pittsburgh, PA (US); Deere & Company, Moline, IL (US)

(72) Inventors: Zachary T. Bonefas, Grimes, IA (US); Herman Herman, Gibsonia, PA (US); Joan Campoy, Pittsburgh, PA (US)

(73) Assignees: Deere & Company, Moline, IL (US); Carnegie Mellon University, Pittsburgh, PA (US)

( * ) Notice: Subject to any disclaimer, the term of this patent is extended or adjusted under 35 U.S.C. 154(b) by 167 days.

(21) Appl. No.: 14/997,012

(22) Filed: Jan. 15, 2016

(65) Prior Publication Data

US 2017/0206645 A1 Jul. 20, 2017

(51) Int. Cl.
*G06T 7/00* (2017.01)
*H04N 13/02* (2006.01)
(Continued)

(52) U.S. Cl.
CPC .......... *G06T 7/0004* (2013.01); *G06T 7/0081* (2013.01); *G06T 7/408* (2013.01); *G06T 7/602* (2013.01); *G06T 19/006* (2013.01); *H04N 5/23293* (2013.01); *H04N 13/02* (2013.01); *G06T 2207/20021* (2013.01); *G06T 2207/30188* (2013.01)

(58) Field of Classification Search
CPC ..... G06T 7/0004; G06T 7/602; G06T 7/0081; G06T 19/006; G06T 7/408; G06T 2207/20021; G06T 2207/30188; H04N 13/02; H04N 5/23293
See application file for complete search history.

(56) References Cited

U.S. PATENT DOCUMENTS 5,749,783 A  5/1998 Pollklas
5,953,076 A  9/1999 Astle et al.
(Continued)

FOREIGN PATENT DOCUMENTS

EP  2020174 A1  2/2009
EP  2311307 B1  12/2011
(Continued)

OTHER PUBLICATIONS

European Search Report for European Application 16200597.9 dated Jun. 12, 2017.

*Primary Examiner* — Zhihan Zhou
(74) *Attorney, Agent, or Firm* — Michael G. Monyok; David G. Oberdick

(57) ABSTRACT

First imaging device collects first image data, whereas second imaging device collects second image data of a storage portion. An image processing module identifies a rim of a container in either the first image data or the second image data. The image processing module then overlays an outline of the rim in an image presented on a display to an operator of a transferring vehicle. The image processing module further identifies the fill level of material in a receiving vehicle container and overlays this information in the image presented on the display.

14 Claims, 10 Drawing Sheets
(3 of 10 Drawing Sheet(s) Filed in Color)

(51) Int. Cl.
    *G06T 7/60*       (2017.01)
    *G06T 19/00*     (2011.01)
    *G06T 7/40*       (2017.01)
    *H04N 5/232*     (2006.01)

(56) References Cited

U.S. PATENT DOCUMENTS

| | | | |
|---|---|---|---|
| 6,100,925 | A | 8/2000 | Rosser et al. |
| 6,434,257 | B1 * | 8/2002 | Mohan ................ G01B 11/024 348/89 |
| 6,943,824 | B2 | 9/2005 | Alexia et al. |
| 8,499,537 | B2 | 8/2013 | Correns et al. |
| 8,682,540 | B2 | 3/2014 | Missotten et al. |
| 9,119,342 | B2 | 9/2015 | Bonefas |
| 2009/0044505 | A1 * | 2/2009 | Huster ................ A01D 43/087 56/10.2 R |
| 2014/0083556 | A1 * | 3/2014 | Darr .................... A01D 43/087 141/1 |
| 2014/0298153 | A1 * | 10/2014 | Tsujimoto ............ G02B 21/365 715/232 |
| 2014/0311113 | A1 * | 10/2014 | Bonefas ............... A01D 34/001 56/10.2 R |
| 2014/0325422 | A1 * | 10/2014 | Madsen ............... A01D 43/087 715/771 |

FOREIGN PATENT DOCUMENTS

| | | |
|---|---|---|
| EP | 2798939 A1 | 11/2014 |
| WO | 2011/101458 A1 | 8/2011 |
| WO | 2013/120062 A1 | 8/2013 |

* cited by examiner

FILL LEVEL INDICATOR FOR AN AUTOMATED UNLOADING SYSTEM

CROSS-REFERENCE TO RELATED APPLICATIONS

Not applicable.

STATEMENT REGARDING FEDERALLY SPONSORED RESEARCH

Not applicable.

JOINT RESEARCH AGREEMENT

This application resulted from work performed under or related to a joint research agreement between Carnegie Mellon University and Deere & Company, entitled "Development Agreement between Deere & Company and Carnegie Mellon University," dated Jan. 1, 2008 and as such is entitled to the benefits available under 35 U.S.C. § 103(c).

BACKGROUND OF THE INVENTION

This invention relates to a system that provides visual aid to an operator of an agricultural machine. More specifically, the invention relates to a system that presents information on a display relating to a fill level of a container and a positioning of an opening of the container.

Operators of agricultural machinery, such as combines and self-propelled forage harvesters, are tasked with maintaining coordination of several simultaneous operations. For example, the operator must maintain the speed and direction of the harvesting machine, monitor machine performance, identify obstacles in the field, observe the fill status of the container, and maximize throughput, to name a few. Continuous performance of these tasks can lead to operator stress and fatigue, resulting in decreased harvest efficiency. In addition, by visually confirming the fill level of the container and alignment of the material discharge end over the container, harvesting operations are mostly limited to daytime. Systems have been developed to assist the operator with adjusting the spout and maintaining proper spacing between the harvesting machine and the transport machine. Some systems are even capable of automated control of several of these processes. While these systems are helpful, the status of the fill level in the container still requires the operator's constant attention to ensure the systems are operating properly. It would therefore be advantageous to develop an unloading system that assists an operator with visualizing the fill level of the container and the positioning of the opening of the container.

BRIEF SUMMARY OF THE INVENTION

According to embodiments of the present invention is a system that presents on a display a visual representation of the fill level of a container to the operator of a harvesting machine or other material transferring vehicle. An imaging system, which can be part of an automated transferring system, captures image data of the container of a receiving vehicle, as well as the material within the container. An image processing module receives the image data and identifies a rim of the container in the image data. Once the rim, or perimeter of the opening, is identified, the area is divided into smaller cells. The height of the material is determined for each cell from the image data using the image processing module.

The information determined by the image processing module is combined with the image of the container and displayed to the operator. In one embodiment, the fill level of the material is displayed as colored bars superimposed in the live image on the near wall of the container. Additionally, the rim of the container is highlighted in the live image as a colored overlay. In alternative embodiments, the color of the bars can change depending on the fill level of the material in the container. In automated transferring systems, in which the present invention can be incorporated, the operator does not directly control many of the unloading operations. The data visualization of the present invention allows the operator to determine if the automated system is performing correctly or if any adjustments are necessary.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
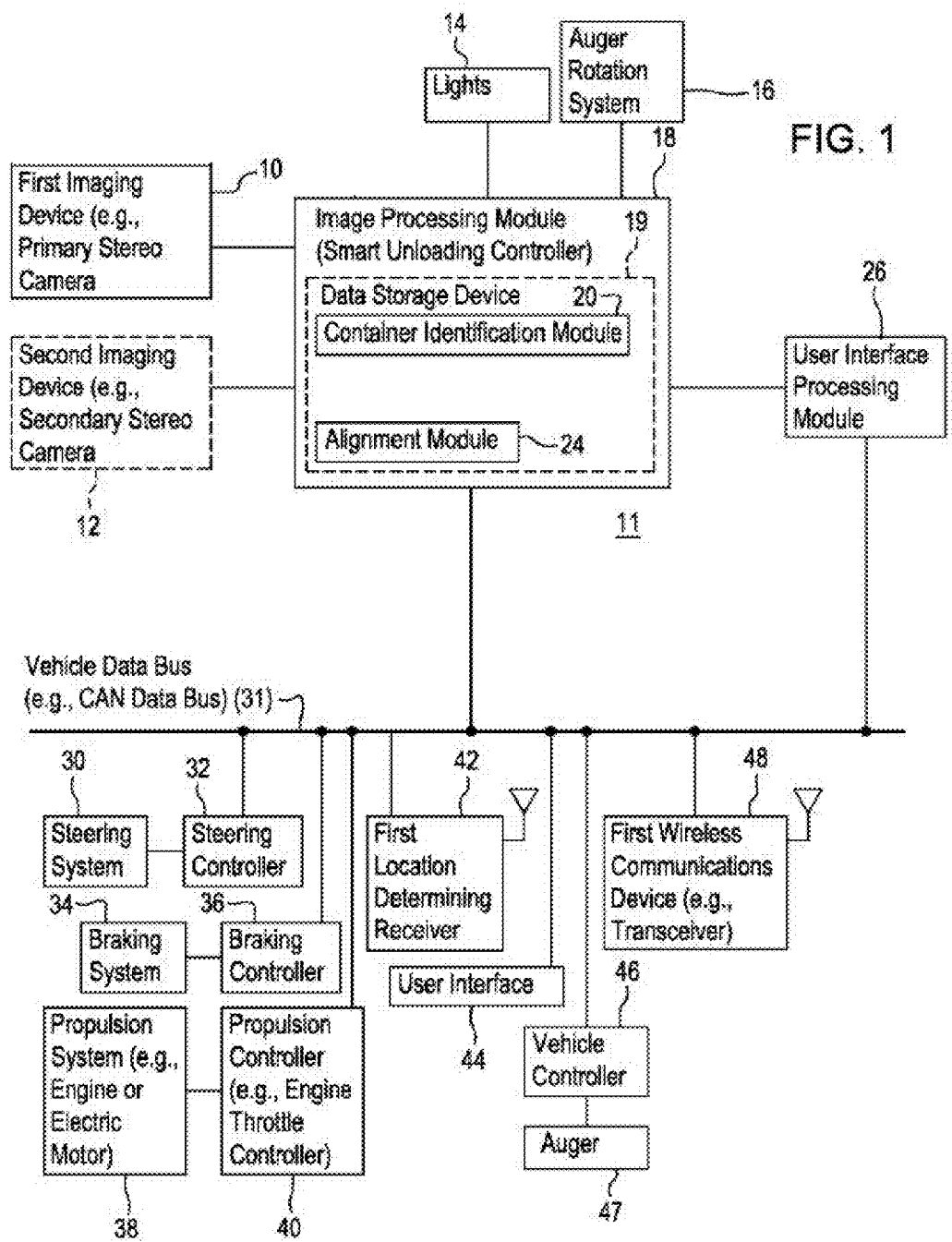
FIG. 1 is a block diagram of one embodiment of a stereo vision system for a harvesting vehicle for managing the unloading of agricultural material from the harvesting vehicle (e.g., combine).

In accordance with one embodiment, FIG. 1 shows a system 11 used by a harvesting vehicle for managing the unloading of agricultural material from the harvesting vehicle (also referred to herein as a transferring vehicle, a combine, a harvester, and a self-propelled forage harvester) to a receiving vehicle (also referred to herein as a tractor, propelled portion, trailer, grain cart, cart, storage portion, container, or wagon). In one embodiment, the system 11 comprises a first imaging device 10 and second imaging device 12 coupled to an image processing module 18. The first imaging device 10 may comprise a primary stereo camera, while the second imaging device 12 may comprise a secondary stereo camera. In some configurations, the second imaging device 12 is optional, as denoted by the dashed lines in FIG. 1.

Figure 5:
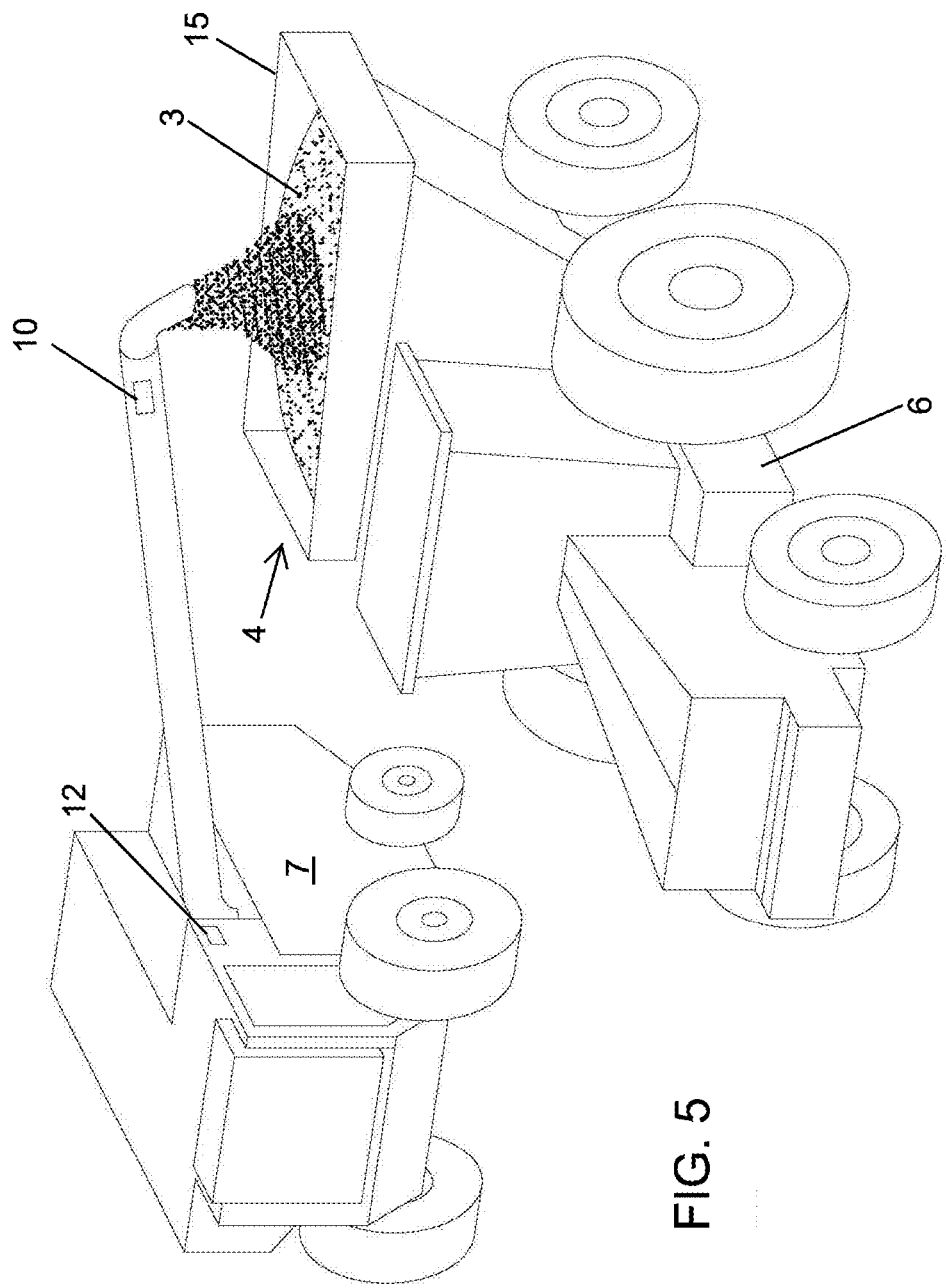
FIG. 5 is a perspective view of a combine unloading grain into a cart.
Figure 6:
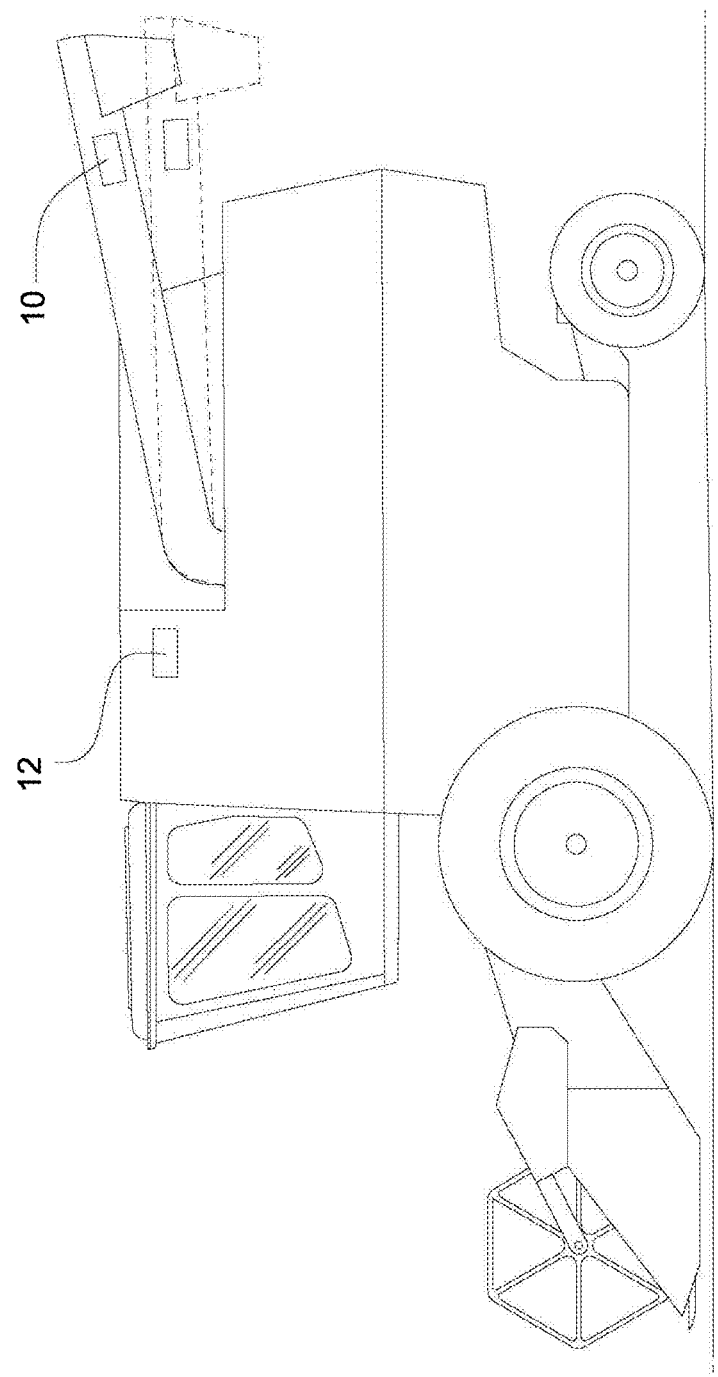
FIG. 6 is a side view of a combine illustrating the repositioning of a first imaging device as an auger moves up and down.

The first imaging device 10 or second imaging device 12 is mounted at a sufficiently high elevation to have some visibility into the storage container 4 (e.g., grain cart), or sufficient visibility of the interior of the storage container 4 and its contents, to provide image data for the image processing module 18 to determine a profile, distribution, or level of agricultural material (e.g., grain) within a volume or portion of the volume defined by the container 4. Stated differently, mounting the imaging device 10 or 12 at a height allows them to observe the surface 3 of the grain as the grain cart 4 fills. In one configuration, as shown in FIGS. 5-6, the second imaging device 12 is mounted on the chassis 7 of the combine 2. In this configuration, the imaging device 12 can be tilted down to prevent excessive sun glare and reduce the accumulation of dust settling on the imaging device 12.

When multiple imaging devices 10, 12 are used, data fusion algorithms are used to register and combine the output of the multiple devices 10, 12 to product a single, accurate, and robust measurement of the fill level. The image data related to the fill level is integrated using a model based filter to produce an accurate measurement of the fill level.

One embodiment of the present invention includes a built-in switchover to handle failure in one or more imaging devices 10, 12. If one or more imaging devices 10, 12 fail and are disabled during operation, then the filtering and registration algorithms automatically uses information only from the remaining imaging device 10 or 12. The same switchover functionality can also be used to handle occlusion that blocks one or more views. Failure detection uses consistency in the measurements from multiple imaging devices 10, 12.

In embodiments involving an automated unloading capability, the image processing module 18, or smart unloading controller, is connected to lights 14, auger rotation system 16, user interface processing module 26, and a vehicle data bus 31. The vehicle data bus 31 connects various components of the transferring vehicle 7, including the steering system 30, steering controller 32, braking system 34, braking controller 36, propulsion system 38, propulsion controller 40, vehicle controller 46, and auger 47. These various components, in connection with the image processing module 18 and imaging devices 10 and 12, provide automated control of the unloading process, which are generally known in the art as Machine Sync and Active Fill Control. U.S. Pat. No. 9,119,342 describes such a system and is incorporated by reference herein. The vehicle data bus 31 is further connected to a first location determining receiver 42, a user interface 44, and a first communications device 48.

The system 11 of FIG. 1 is well suited for use on a combine 2 or harvester as the harvesting vehicle. The system 11 of FIG. 1 may communicate and cooperate with a second system (211 of FIG. 3) on the receiving vehicle 6 to coordinate the relative alignment of the harvesting vehicle 2 and the receiving vehicle 6 during unloading or transferring of material from the harvesting vehicle. Similarly, the image data from the first imaging device 10, the second imaging device 12, or image processing module 18 can be transmitted to the receiving vehicle 6 via the first wireless communications device 48 and the second wireless communications device 148, for display on the user interface 44 of the receiving vehicle 6.

Figure 2:
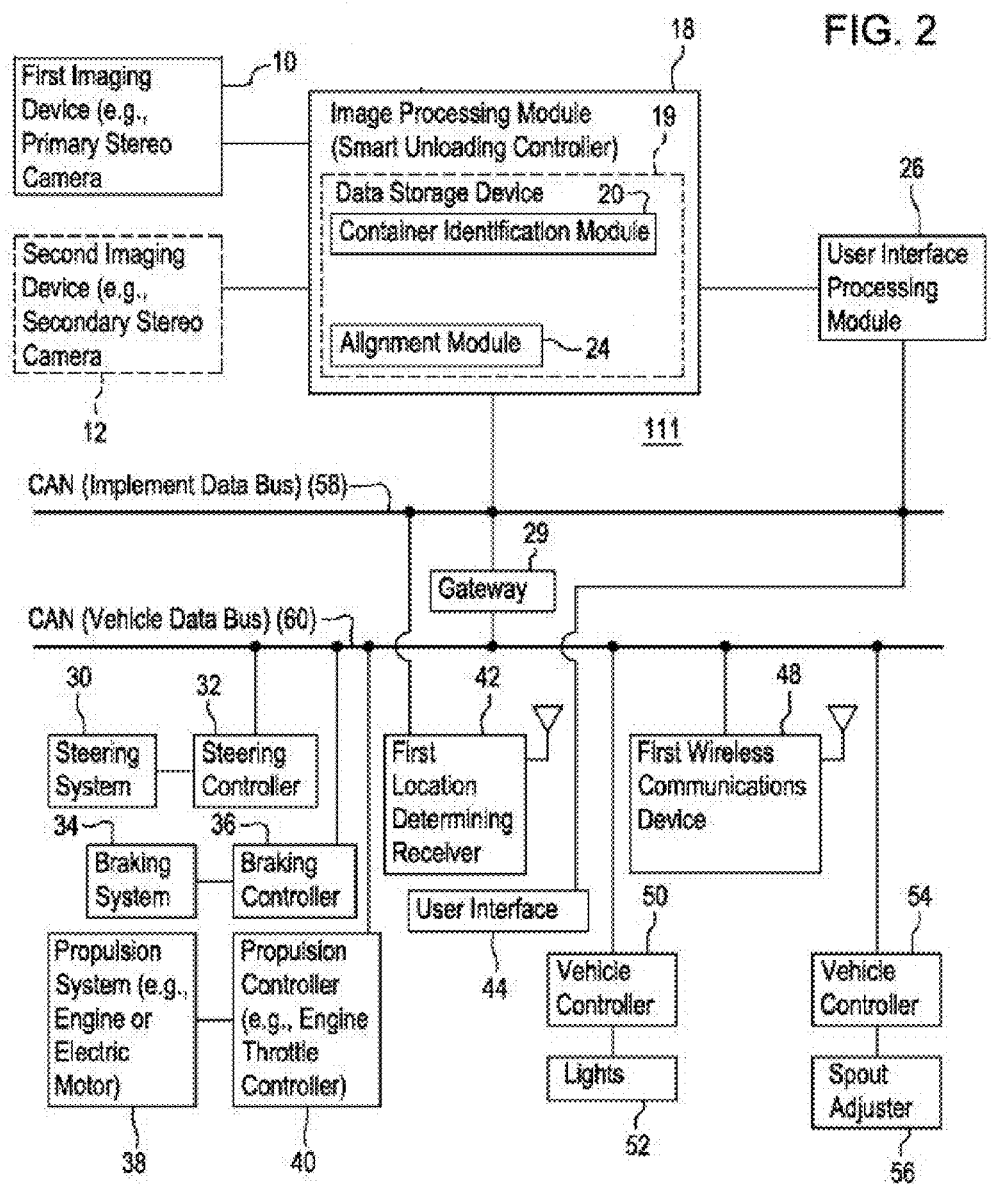
FIG. 2 is a block diagram of another embodiment of a stereo vision system for a harvesting vehicle for managing the unloading of agricultural material from the harvesting vehicle (e.g., a self-propelled forage harvester).

The system 111 of FIG. 2 is similar to the system 11 of FIG. 1; except that the system 111 of FIG. 2 further comprises an implement data bus 58, a gateway 29, and vehicle controllers 50, 54 coupled to the vehicle data bus 60 for the lights 52 and spout adjuster 56. The gateway 29 supports secure or controlled communications between the implement data bus 58 and the vehicle data bus 60. The vehicle controller 50 controls the lights 52; the vehicle controller 54 controls the spout adjuster 56 for moving or adjusting the orientation or angle of the spout or auger 47, or its spout discharge end 87. Like reference numbers in FIG. 1 and FIG. 2 indicate like elements.

In FIG. 2, a location determining receiver 42, a user interface 44, a user interface processing module 26, and the gateway 29 are coupled to the implement data bus 58. Vehicle controllers 50, 54 are coupled to the vehicle data bus 60. In turn, the vehicle controllers 50, 54 are coupled, directly or indirectly, to lights 14 on the harvesting vehicle and the spout 89 of the harvesting vehicle (e.g., self-propelled forage harvester). Although the system 111 of FIG. 2 is well suited for use or installation on a self-propelled forage harvester, the system 111 of FIG. 2 may also be applied to combines, harvesters or other heavy equipment.

Figure 3:
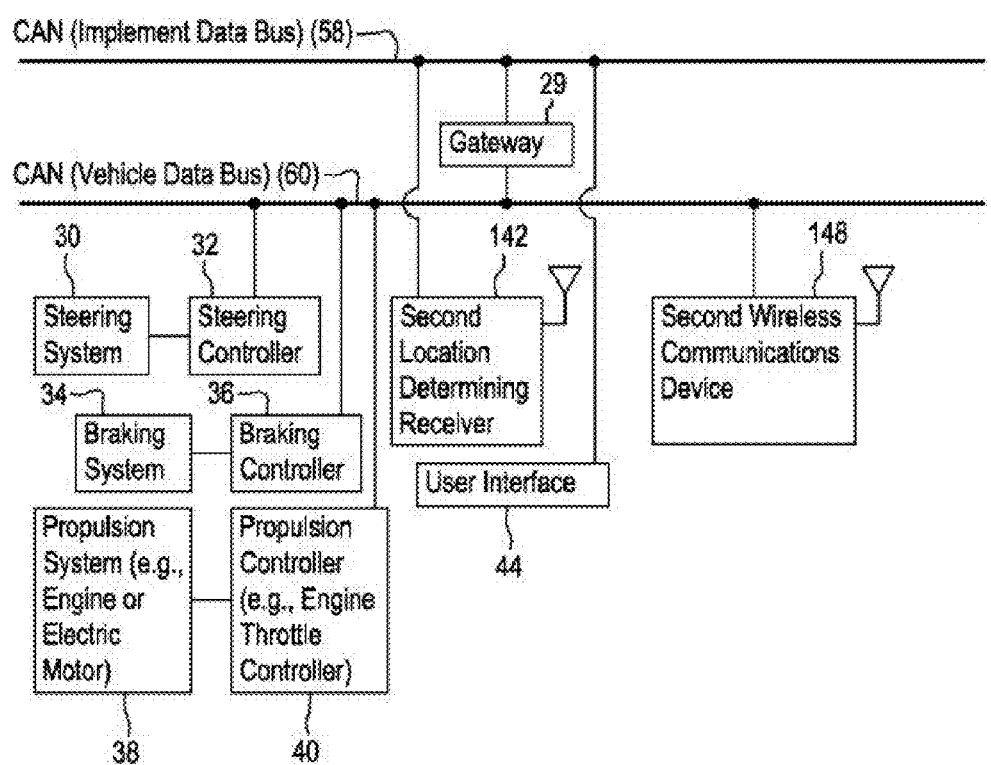
FIG. 3 is a block diagram of an embodiment of a system for a receiving vehicle (without stereo vision) for managing the unloading of agricultural material from a transferring vehicle.
Figure 4A:
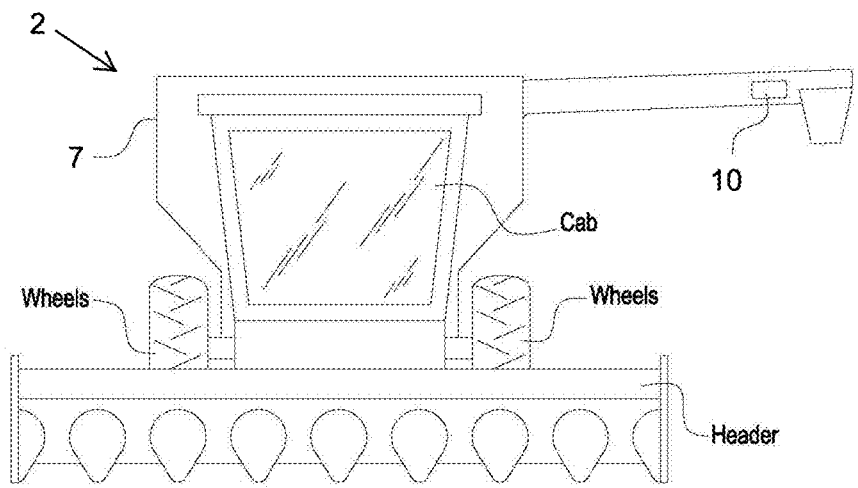
FIGS. 4A and 4B are front views of a combine and a forge harvester, respectively, illustrating features of the present invention.
Figure 4B:
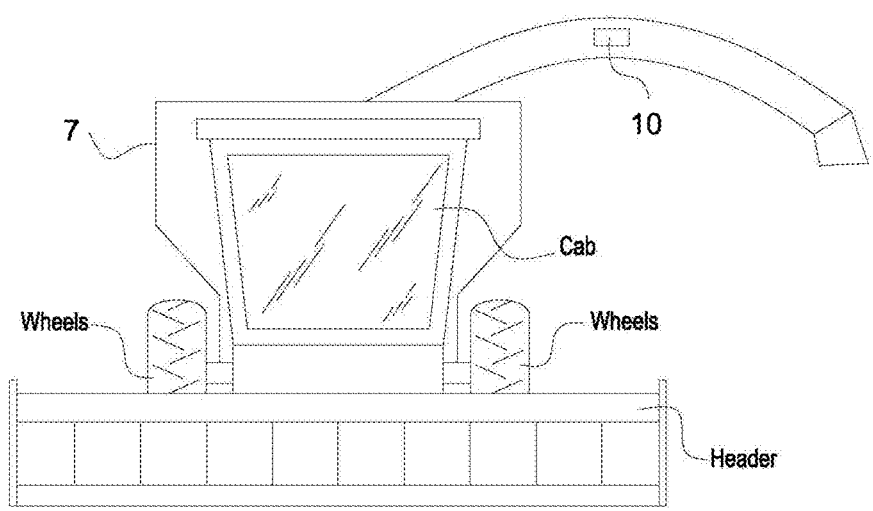

The system 211 of FIG. 3 comprises a second wireless communications device 148 for communicating with the first communications device 48 of FIG. 1 or FIG. 2, for example. The wireless devices 48, 148 may exchange or communicate position data, relative position data, command data, or control data for controlling, adjusting or coordinating the position and orientation of the vehicles. In addition, the wireless devices 48, 148 may exchange image data, including the information indicating filling status, fill strategy, offset adjustment, and imaging device quality. The second wireless communications device 148 is coupled to the vehicle data bus 31. In FIG. 3, the system 211 for a receiving vehicle 6 can be used in conjunction with the system (11 or 111) of the harvesting vehicle 2 of FIG. 1 or FIG. 2, and further includes a second location determining receiver 142.

Referring again to FIG. 1, the image processing module 18 may be coupled, directly or indirectly, to lights 14 on a vehicle (e.g., harvesting vehicle) for illumination of a storage container or for illumination of a field of view of the first imaging device 10, the second imaging device 12, or both for acquiring raw images (e.g., of sufficient brightness, contrast and color reproduction). For example, the image processing module 18 may control drivers or switches, which in turn control the activation or deactivation of lights 14 on the harvesting vehicle. The image processing module 18 may activate the lights 14 on the vehicle for illumination of the storage container (e.g., 4 in FIG. 5) if a light meter indicates that an ambient light level is below a certain minimum threshold. In one configuration, the light meter comprises a photo-sensor, photo-resistor, photo-sensitive device, or a cadmium-sulfide cell.

The lights 14 should be mounted in a position relative the cameras 10, 12 such that the backscattering of the light into the camera lenses is minimized. This is achieved by putting as much distance between the cameras 10, 12 and lights as possible and aiming the lights such that the direction they are pointed is significantly different from the optical axis of the imaging devices 10, 12.

The imaging processing module 18 may comprise a controller, a microcomputer, a microprocessor, a microcontroller, an application specific integrated circuit, a programmable logic array, a logic device, an arithmetic logic unit, a digital signal processor, or another data processor and supporting electronic hardware and software. In one embodiment, the image processing module 18 comprises a container identification module 20, and an alignment module 24.

The image processing module 18 may be associated with a data storage device 19. The data storage device 19 may comprise electronic memory, non-volatile random access memory, a magnetic disc drive, an optical disc drive, a magnetic storage device or an optical storage device, for example. If the container identification module 20 and the alignment module 24 are software modules they are stored within the data storage device 19.

To show the outline of the perimeter 15 of the opening on a display, first the perimeter must be identified in the stereo image data collected by the first imaging device 10 or second imaging device 12. In one embodiment, the container identification module 20 identifies a set of two-dimensional or three dimensional points (e.g., in Cartesian coordinates or Polar coordinates) in the real world that define at least a portion of the container perimeter (e.g., front edge or rear edge) of the storage portion (e.g., cart 4 in FIG. 5). The set of two-dimensional or three dimensional points correspond to pixel positions in images collected by the first imaging device 10, the second imaging device 12, or both. The container identification module 20 may use or retrieve container reference data.

The container reference data comprises one or more of the following: reference dimensions, reference shape, drawings, models, layout, and configuration of the container 4, such as the container perimeter, the container edges; reference dimensions, reference shape, drawings, models, layout, and configuration of the entire storage portion 4 of receiving vehicle 6; storage portion wheelbase, storage portion turning radius, storage portion hitch configuration of the storage portion 4 of the receiving vehicle 6. The container reference data may be stored and retrieved from the data storage device 19 (e.g., non-volatile electronic memory). For example, the container reference data may be stored by, retrievable by, or indexed by a corresponding receiving vehicle identifier in the data storage device 19 of the harvesting vehicle system 11. For each receiving vehicle identifier, there can be a corresponding unique container reference data stored therewith in the data storage device 19. Once the linear orientation of a set of pixels in the collected image data conforms to one or more edges of the perimeter 15 of cart 4 as prescribed by the container reference data, the perimeter 15 of the opening of the container has been identified.

In another embodiment, the first imaging device 10, second imaging device 12, or both, captures stereo images (i.e. image data) of the container 4 that is being filled. Using the image data, the image processing module 18 detects the corners of the top opening of the container 4 and uses the stereo disparity image to measure the distance to those corners. The image processing module 18 then identifies pixels in the disparity image that are located within a rectangular area detected to be the top opening of the container 4, thus identifying the perimeter 15.

In one configuration, the image processing module 18 applies a stereo matching algorithm or disparity calculator to collected stereo image data. The stereo matching algorithm or disparity calculator may comprise a sum of absolute differences algorithm, a sum of squared differences algorithm, a consensus algorithm, or another algorithm to determine the difference or disparity for each set of corresponding pixels in the right and left image (e.g., along a horizontal axis of the images or parallel thereto).

In an illustrative sum of the absolute differences procedure, the right and left images (or blocks of image data or rows in image data) can be shifted to align corresponding pixels in the right and left image. The stereo matching algorithm or disparity calculator determines a disparity value between corresponding pixels in the left and right images of the image data. For instance, to estimate the disparity value, each first pixel intensity value of a first subject pixel and a first sum of the first surrounding pixel intensity values (e.g., in a block or matrix of pixels) around the first pixel is compared to each corresponding second pixel intensity value of second subject pixel and a second sum of the second surrounding pixel intensity values (e.g., in a block or matrix of pixels) around the second pixel. The disparity values can be used to form a disparity map or image for the corresponding right and left image data.

In one embodiment, the image processing module 18 comprises an edge detector for measuring the strength or reliability of one or more edges, or points on the container perimeter 15 in the image data. The edge detector may apply an edge detection algorithm to the image data. Any number of suitable edge detection algorithms can be used by the edge detector. Edge detection refers to the process of identifying and locating discontinuities between pixels in an image or collected image data. For example, the discontinuities may represent material changes in pixel intensity or pixel color which defines boundaries of objects in an image. A gradient technique of edge detection may be implemented by filtering image data to return different pixel values in first regions of greater discontinuities or gradients than in second regions with lesser discontinuities or gradients. For example, the gradient technique detects the edges of an object by estimating the maximum and minimum of the first derivative of the pixel intensity of the image data. The Laplacian technique detects the edges of an object in an image by searching for zero crossings in the second derivative of the pixel intensity image. Further examples of suitable edge detection algorithms include, but are not limited to, Roberts, Sobel, and Canny, as are known to those of ordinary skill in the art. The edge detector may provide a numerical output, signal output, or symbol, indicative of the strength or reliability of the edges in field. For example, the edge detector may provide a numerical value or edge strength indicator within a range or scale or relative strength or reliability to the linear Hough transformer.

Figure 7:
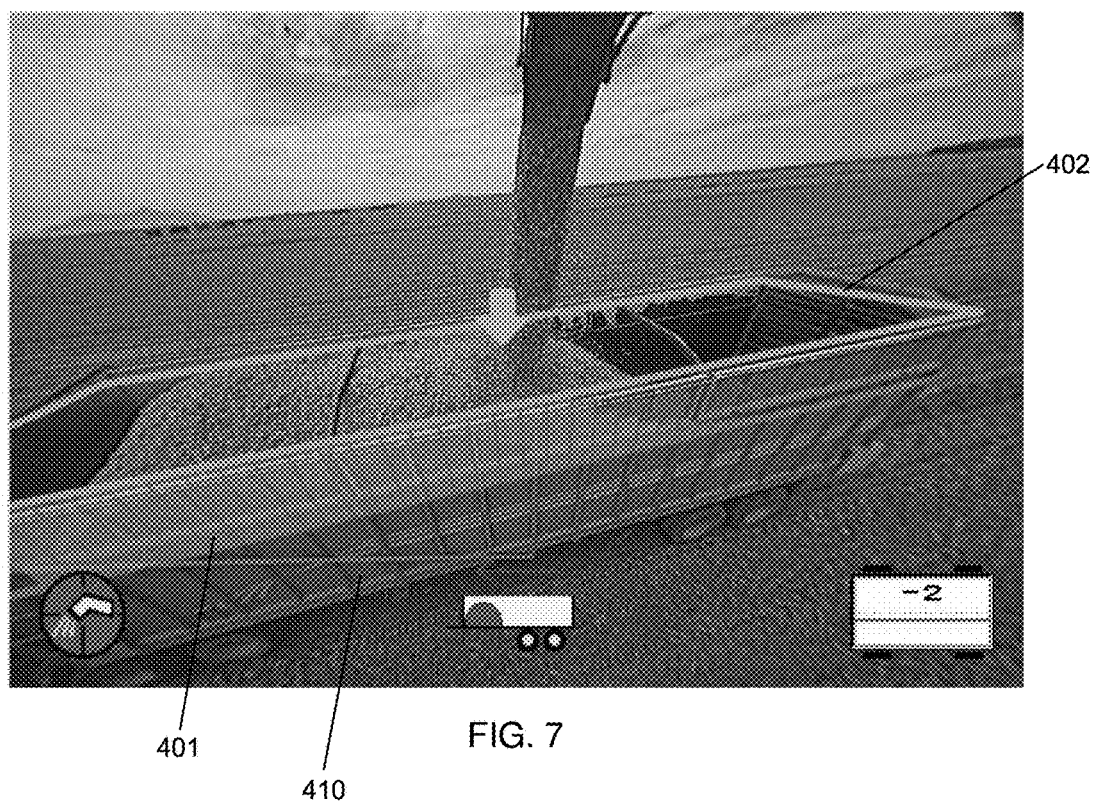
FIG. 7 shows an example of a display according to one embodiment, with the image data presented to the operator on the display.
Figure 8:
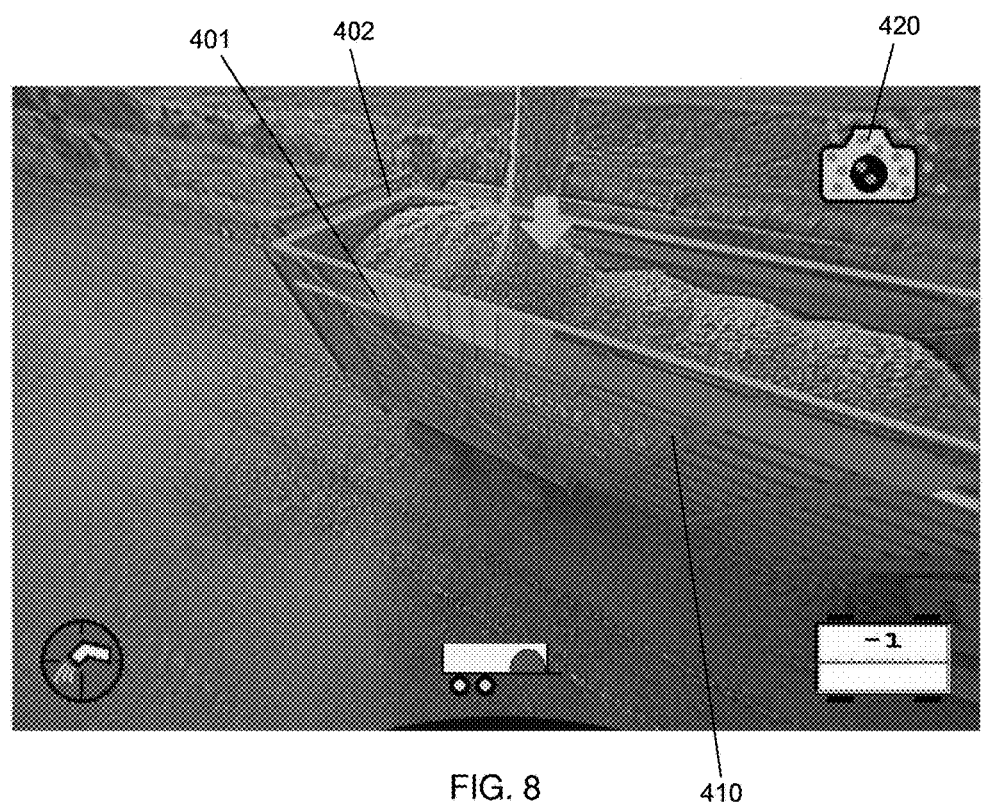
FIG. 8 shows another example of a display in an alternative embodiment, with the image data presented to the operator.
Figure 9:
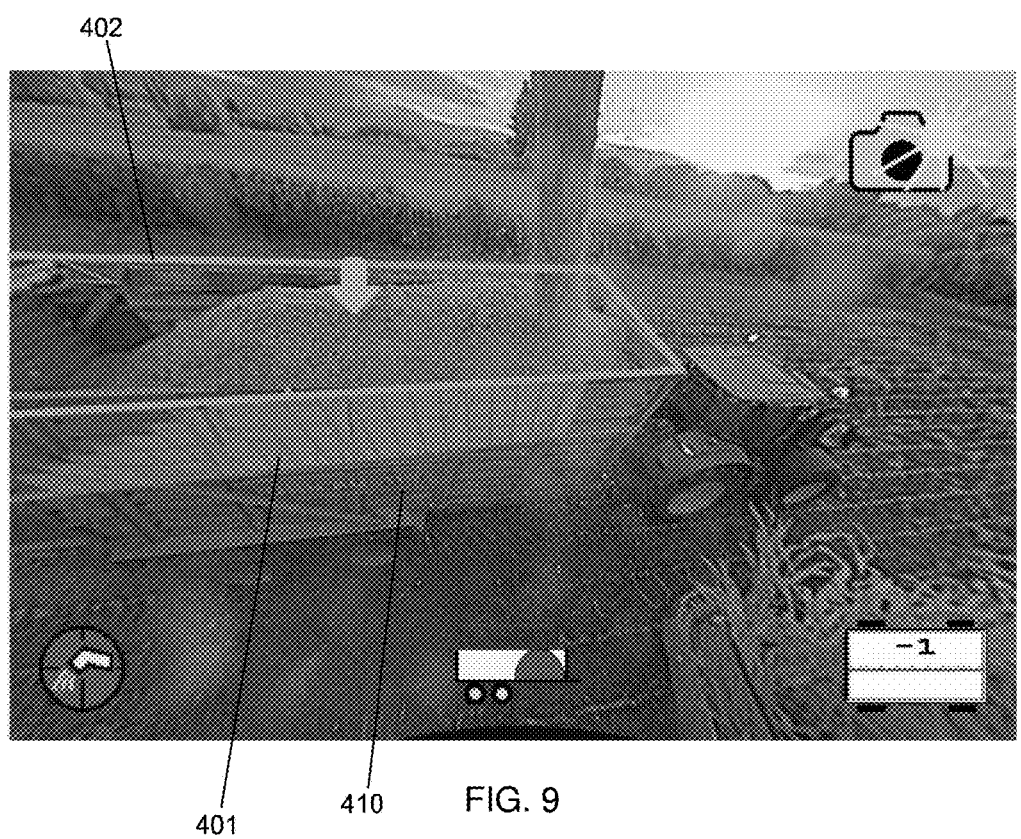
FIG. 9 shows another example of the image data presented to the operator.

The set of pixels identified as the perimeter 15 of cart 4 will be augmented in the image captured by the first imaging device 10 or the second imaging device 12 to highlight the perimeter 15, or border, of the opening of the cart 4. That is, the perimeter 15 will be shown in the image as a different color than the cart 4 itself. In one embodiment (as shown in FIGS. 7-9), a rectangle of four opaque, green colored line segments is drawn over the border 15 as second augmented image data. This image, with the second augmented image data 402 overlaid on the captured image, is displayed to the operator via user interface 44, which can comprise a video screen, LCD screen, or other display device.

Figure 10:
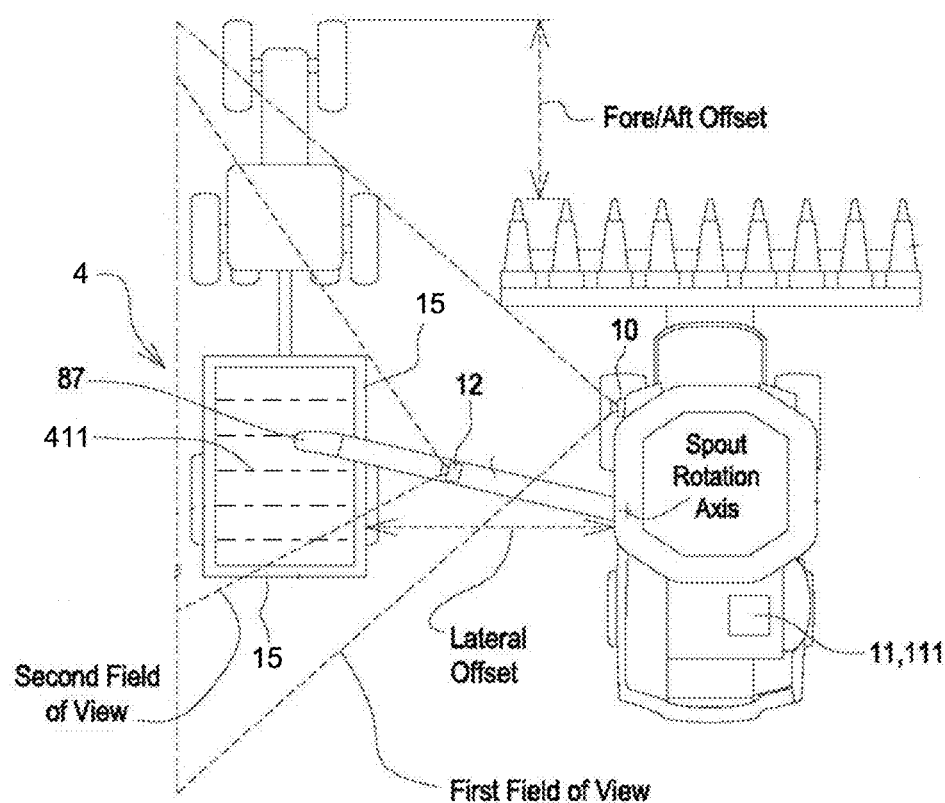
FIG. 10 is a block diagram showing the container divided into a matrix of cells.

Once the perimeter 15 is identified, the rectangular area defined as the top opening of the container 4 is divided into smaller rectangles called cells, creating a matrix of cells 411, as shown in FIG. 10. The height of the pixels in the cells are calculated from the disparity image, averaged, and compared to the relative height of the container 4 opening perimeter 15 that intersects the cell boundary. The average height of the pixels in each cell are stored in an array and filtered (using a median filter, for example) with the average height of neighboring cells to create a smoothed fill profile of material heights inside the container 4.

Even when under automated control, the operator constantly monitors the filling state of the container 4 to ensure all processes are operating properly. To aid the operator, the profile of the material in the container 4, or fill status, is displayed as a virtual representation on the user interface. The virtual representation (or first augmented image data 401) can be displayed as translucent vertical bars over the near wall 410 of the container 4. Each bar corresponds to one of the series of cells within the storage volume of the container 4. See, for example, the green bars in FIGS. 7-9. The bars can be drawn using a technique known as alpha-blending. In alternative embodiments, other visual overlay techniques, known by those in the art, can be used.

Referring again to FIGS. 7-9, the height of the vertical bars is proportional to the height of the material in the corresponding cell. That is, the color of each bar is representative of the cell fill level. In the embodiment shown in FIG. 8, when the height of material in a particular cell reaches the desired fill height or maximum fill height the color of the vertical bar corresponding to that cell is shown as green. Cells that are not completely full have orange colors. That is, orange represents an intermediate fill height. Alternatively, the colors of the vertical bars could be a proportional gradient of some nearly continuous palette of gradually changing colors. For example, cells with fill heights that are at the minimum fill height or below the minimum detectable fill height would be at one end of the palette; conversely, cells with fill heights at or above the desired fill height would be at the other end of the palette.

The information presented on the user interface 44 is also useful in situations where the unloading is not under control of an automated loading system. This situation may arise where the image data is of poor quality due to dusty conditions, direct sunlight, or other factors. For example, the image quality indicator 420 shown in FIG. 8 indicates dusty conditions. The dust may diminish image quality such that automated control is not feasible (for example, there is a lack of spout tracking), but the image quality may be sufficient to provide fill status and other information to the operator.

In one embodiment, the image processing module 18 provides the image data to a user interface processing module 26 that provides, directly or indirectly, status message data and performance message data to the user interface 44. As illustrated in FIG. 1, the image processing module 18 communicates with a vehicle data bus 31 (e.g., Controller Area Network (CAN) data bus). In one configuration, a user interface 44 is arranged for displaying filling status, fill strategy, offset adjustment, and imaging device quality. Alternatively, the image data is sent directly to the user interface 44.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method of displaying on a user interface a level of agricultural material in a container, the method comprising:
    obtaining stereo image data from at least one imaging device facing the container;
    identifying a perimeter of an opening of the container from the image data using an image processing module;
    determining a reliability of an edge identified in the perimeter of the opening of the container using an edge detector,
        wherein the edge detector identifies and locates discontinuities between pixels in the image data;
    dividing the opening into a matrix of cells,
        wherein each cell of the matrix of cells spans a width of the container;
    determining an average height of pixels in the stereo image data for each cell in the matrix of cells,
        wherein the height of the pixels corresponds to a height of the agricultural material in the container;
    displaying on a user interface first augmented image data relating to the height of the agricultural material in each cell in the matrix of cells relative to a height of the container where the perimeter of the opening of the container intersects a boundary of each cell in the matrix of cells;
    displaying on a user interface second augmented image data relating to the perimeter of the opening of the container,
    wherein the first augmented image data and the second augmented image data are overlaid on the image data of the container.

2. The method of claim 1, wherein the first augmented image data is a virtual representation of the average height of the agricultural material in the container.

3. The method of claim 2, wherein the virtual representation is a plurality of translucent pixels displayed on a sidewall of the container.

4. The method of claim 1, wherein the second augmented image data is a virtual outline overlying the perimeter of the opening.

5. The method of claim 4, wherein the virtual outline is a plurality of opaque pixels displayed in the image data.

6. The method according to claim 1, further comprising updating the first augmented image data in real-time as agricultural material is added to the container.

7. The method according to claim 1, wherein the second augmented image data comprises opaque pixels that replace pixels in the image data.

8. The method according to claim 1, wherein the first augmented image data is generated using an alpha-blending technique.

9. The method according to claim 1 wherein the cells are substantially rectangular.

10. The method according to claim 1 wherein the average height comprises a median height.

11. The method of claim 1, wherein the first augmented image data comprises a plurality of colors, wherein each color of the plurality of colors represents a different average height.

12. The method of claim 1, wherein the first augmented image data comprises a color palette, wherein a first end of the color palette represents a minimum fill height and a second end of the color palette represents a maximum fill height.

13. The method of claim 1, wherein the first augmented image data comprises red, orange, and green colors,
    wherein green signifies a cell fill level at a maximum fill height,
    wherein orange signifies a cell fill level below a maximum fill height but above a minimum fill height, and
    wherein red signifies a cell fill level at the minimum fill height.

14. The method of claim 1, wherein the user interface is an LCD screen.

\* \* \* \* \*